United States Patent
Wu et al.

[19]

[11] Patent Number: 6,137,469
[45] Date of Patent: Oct. 24, 2000

[54] COMPUTER-TV VIDEO CONVERTING APPARATUS

[75] Inventors: Ming Chi Wu; Hsin-Hung Yeh; Yung-Che Chang, all of Taipei, Taiwan

[73] Assignee: Avermedia Technologies, Inc., Taipei Hsien, Taiwan

[21] Appl. No.: 08/907,959

[22] Filed: Aug. 11, 1997

Related U.S. Application Data

[63] Continuation of application No. 08/563,540, Nov. 28, 1995, abandoned.

[51] Int. Cl.$^7$ ........................................... G09G 5/00
[52] U.S. Cl. ............................................. 345/131; 345/169
[58] Field of Search ...................... 345/127, 121, 345/130, 138, 352, 356, 213, 169, 157, 156, 128, 129, 131, 158; 348/63, 96

[56] References Cited

U.S. PATENT DOCUMENTS

| | | | |
|---|---|---|---|
| 4,506,300 | 3/1985 | Fearnside | 358/225 |
| 5,302,968 | 4/1994 | Heberle | 345/131 |
| 5,721,565 | 2/1998 | Nguyen | 345/127 |

*Primary Examiner*—Dennis-Doon Chow
*Attorney, Agent, or Firm*—Rosenberg, Klein & Lee

[57] ABSTRACT

A computer-TV, video converting apparatus which transfers any determined partial area of a computer display into a zoomed image displayed onto a large scale TV, screen used for a briefing or a seminar in addition to a preformed partial area converting function, comprising a main converter with a build-in remote signal receiver, a computer cursor coordinate convening device and a remote controller while the remote controller provides the infrared or radio signal to the remote signal receiver by operating the mouse function keys of the remote controller to move the cursor to a center of a determined partial area of the computer display. The computer cursor coordinate converting device converts the absolute coordinate of the cursor center into a relative coordinates and sent the relative coordinate data to the main converter, a microprocessor and a display controller of the main converter then converts the expected zoom area into a video signal to the TV, screen to provide a zoomed image thereon.

5 Claims, 10 Drawing Sheets

COMPUTER-TV VIDEO CONVERTING APPARATUS

CROSS-REFERENCE TO RELATED APPLICATIONS

This Patent Application is a Continuation-in-Part of U.S. patent application Ser. No. 08/563,540, filed on Nov. 28, 1995, Abandoned.

BACKGROUND OF THE INVENTION

The present invention relates to a computer-TV, video converting apparatus, and relates more particularly to such a converting apparatus used for a detail description in a briefing, a seminar or an instructional class which can either converts a present partial area of a computer display into a zoomed image displayed onto a TV, son with a fixed zoom rate, or converts any special area of an object of a computer display into a zoomed image displayed onto a TV, screen with an adjustable zoom rate simply by operating one or two keys of a remote controller.

There are several kinds of video converters have been developed in use for a briefing purpose. But these kinds of video converters still have many problems in operation and function.

Firstly, they use the original keys on the keyboard of a conventional computer for the operation of a converting work therefor, a well-trained computer operator has to be employed for cooperating with the speaker or the instructor in a briefing or an instruction.

Secondly, it takes time to adjust a certain partial area of the computer display for submitting to a converter by the conventional operation to operate a series of keys and the mouse moving. That may course an unexpected break during a fluent speech or a continual instruction.

Thirdly, it only provides a preformed partial area of a computer display with a present zoom to display on a TV, screen, but lacks a genius for choosing an adjustable partial area of a computer display with a variable zoom rate to be converted simply.

Furthermore they lack in remote control for converts the disired image from a computer display to the TV, screen, so the speaker or the instructor can not operate the converter by himself own.

SUMMARY OF INVENTION

The present invention has been accomplished to provide a computer-TV, video converting apparatus which eliminates the aforesaid drawbacks by using a remote controller or computer mouse to operate the converting apparatus simply for operating one or two keys of the remote controller or computer mouse by the users himself.

The converting apparatus according to the present invention comprises a maim converter, a remote controller and a cursor coordinate converting device. While the main converter mainly has a microprocessor and a display control device for converting the image signal of a partial area of a computer display into a zoomed image to display on a TV, screen. And the remote controller provides infrared or radio frequency signals to a build-in remote signal receiver of the main converter to give the order either for a preformed partial area with a preset zoom rate or an adjustable partial area with a variable zoom rate to be converted. In which the remote controller having a plurality of functional keys including a group of partial area performance keys each preset respectively to convert one of the preformed partial areas by a one-key operation therefor, and a group of mouse functional keys including a cursor adjusting knob and two side buttons for converting an adjustable partial area with a variable zoom rate as the user required. Besides, the cursor coordinate converting device which attached to the computer, converts the absolute coordinates of the cursor into the relative coordinates to determine the address of the cursor for an adjustable partial area converting.

DETAILED DESCRIPTION OF THE PREFERRED EMBODIMENT

Figure 3:
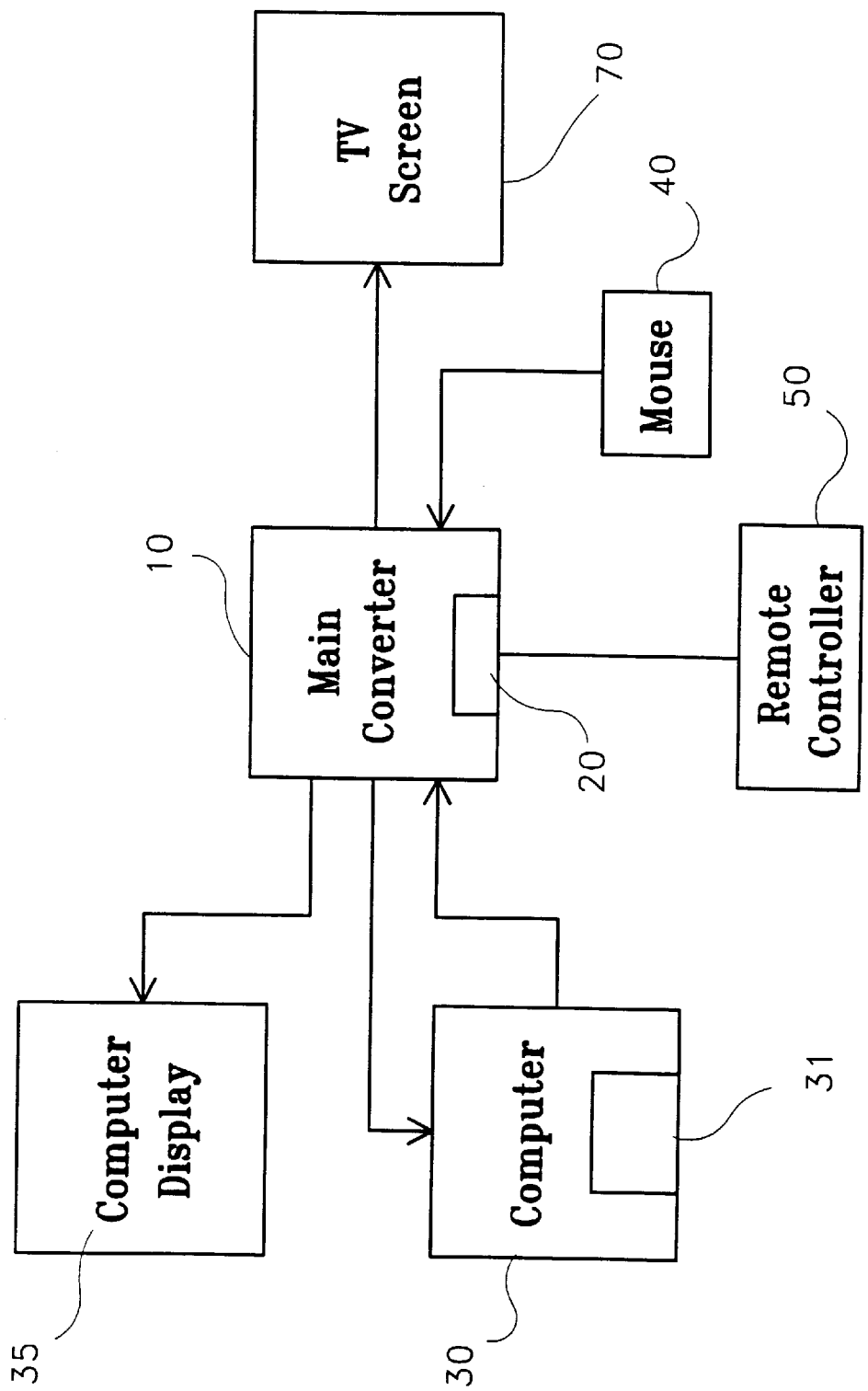
FIG. 3 is a block diagram showing the operating situation of the present invention.

Referring to FIG. 3 a computer-TV, converting apparatus according to the present invention comprises a main converter 10 with a build-in remote signal receiver 20, a cursor coordinate converting device 31 attached to a conventional computer 30, and a remote controller 50.

Figure 2B:
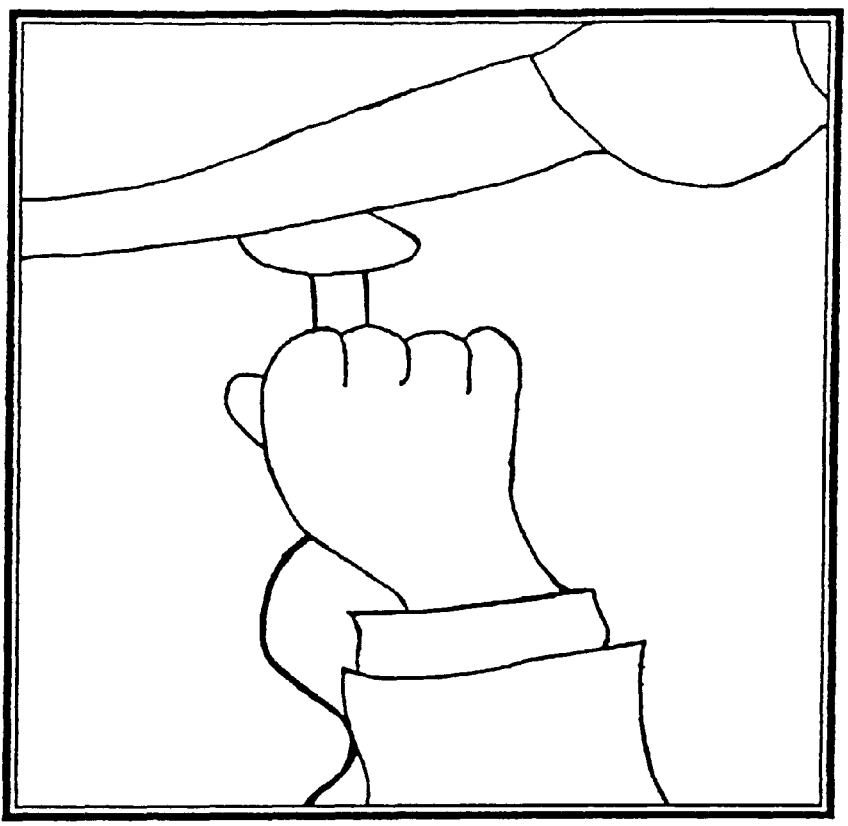
FIGS. 2A & 2B showing an adjustable area of a computer display to be converted to a TV, screen of a variable zoom rate as the user required by operating a cursor adjusting knob and a zoom rate control key of the remote controller.
Figure 2A:
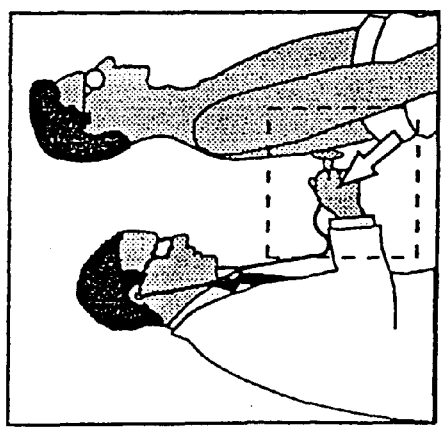

While the user operates the remote controller 50 to deliver the signal to the remote signal receiver 20 for moving the cursor into the center of a expected partial area of the computer display 35 through the cursor coordinate converting device 31, as shown in FIG. 2A, then the main converter 10 converts into a zoomed image displayed on a TV, screen 70, as shown in FIG. 2B, the image signal from the computer 30.

Figure 4:
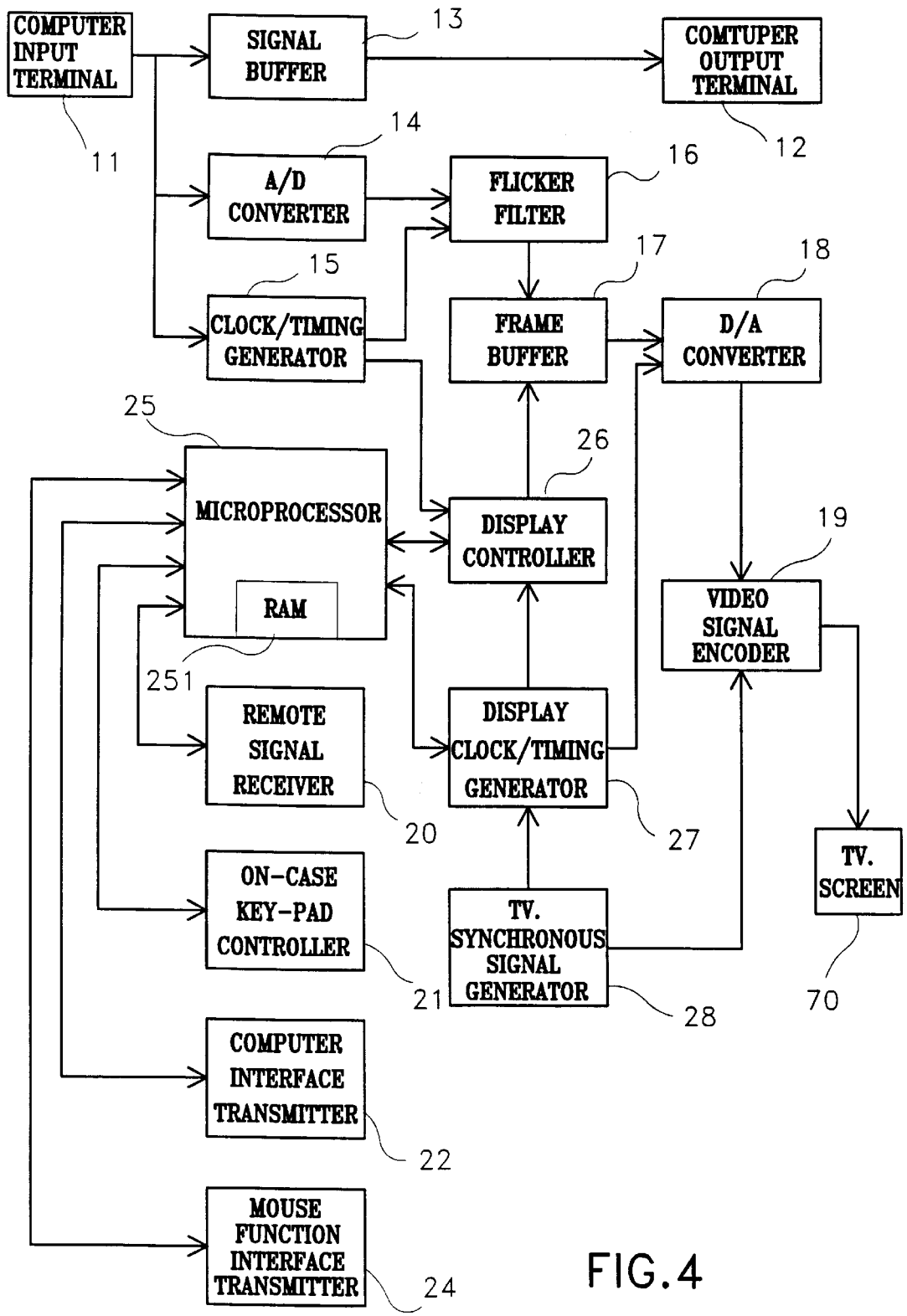
FIG. 4 is a block diagram of a main converter according to the present invention.

FIG. 4 shows a main converter 10 according to the present invention comprising a computer display input that 11 which receives the computer display signal including primary color signal horizontal synchronous signal and vertical synchronous signal, which a branch line delivered the computer display signal to a signal buffer 13 for an amplification, translated into a computer display output terminal 12 and then feed back to the computer display 35 to make the computer display 35 much stable, another branch line delivered the computer display signal to an analog/digital converter (A/D converter) 14 to convert the computer display signal into digital signal according to time segment sampling while the other branch line delivered these signals to a clock/timing generator 15 for triggering the generator 15 to produce the clock/timing frequency signals and synchronous signals for using in all the related circuits. The clock/timing generator 15 connects respectively to the A/D converter 14, a flick filter 16 and a display controller 26, so as to be a synchronous signal control device in combining of these three. The flick filter 16 is used to filter the flick of the digital signal from A/D converter 14 for increasing the stability of image display. A frame buffer 17 temporary keeps the digital signal came from flick filter 16 and ready to convert into a video signal thereafter. A microprocessor 25 is a central processing unit of the main converter 10, which takes process according to the orders delivered from the remote signed receiver 20, a computer interface transmitter 22, an on-case key-pad controller 21 and a mouse function interface receiver 24 (see detail description of FIG. 4) and triggering all the hardwares of the main converter 10 to take responsive actions respectively. The microprocessor 25 can make convertible communication with both the computer 30, computer mouse 40, and the cursor coordinate converting device 31 through the computer interface transmitter 22 and mouse function interface receiver 24 respectively, a random access memory (RAM) 251 disposed to the microprocessor 25 for storing the relative coordinate code of the cursor and tracking the address of the cursor center automatically to determine the partial area which expect to convert, while the microprocessor 25 can transfer the orders given by the remote controller 50 to the computer 30 for processing and displaying, and the computer 30 also may give orders to the microprocessor 25. The TV. synchronous signal produced by a TV, synchronous signal generator 28 delivered to a display clock/timing generator 27 and a video signal encoder 19. The display clock/timing generator 27 produce the clock/timing frequency signals for displaying a video frame, these signals will be sent to a digital/analog (D/A) converter 18 and the video signal encoder 19 for video signal converting and encoding, and these signals also be sent to the display controller 26 to control the in/out of the frame digital signal. The display controller 26 then could control the data in/out and the zoom function of the frame buffer 17 according to clock/timing frequency signals given by both the clock/timing generator 15 and the display clock/timing generator 27 and to synchronous with the order given by the microprocessor 25. The D/A converter 18 receives the collected digital signals through the frame buffer 17 with the clock/timing frequency signal given from the display clock/timing generator 27 to convert the digital signals into analog signals including the primary a color signal, and then sent these analog signals to a encoder 19 to encode anew a code system which the TV. 70 can accept and display.

Figure 1B:
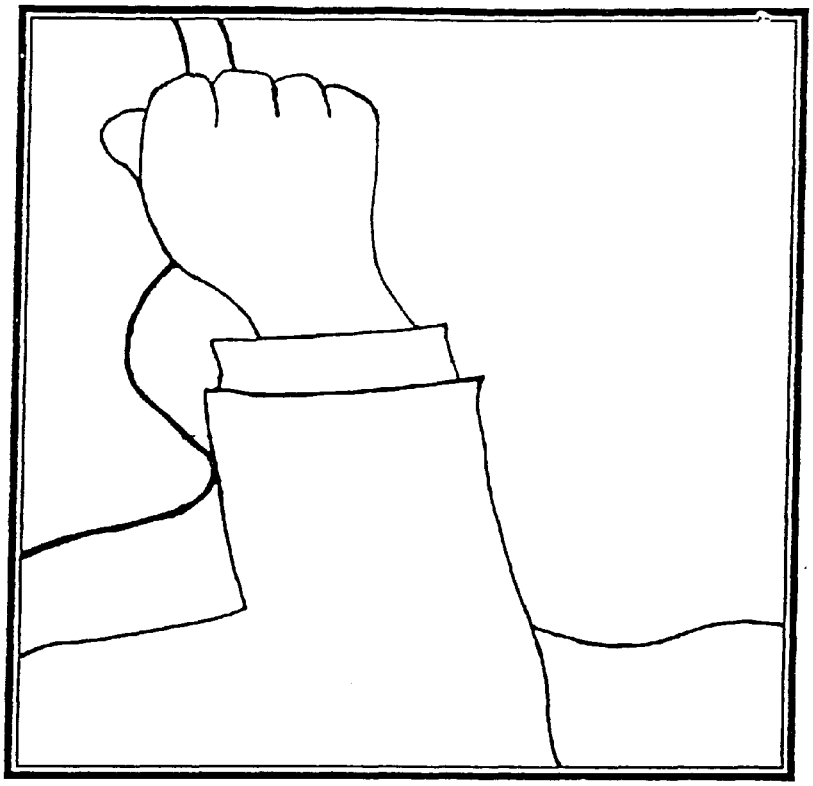
FIGS. 1A & 1B showing a computer display preformed into nine frames of partial area according to a preferably embodiment of the present invention, which can be converted into a zoomed display of a preset zoom rate onto a TV, screen by a one-key operation of the remote controller or computer mouse frame by frame.
Figure 1A:
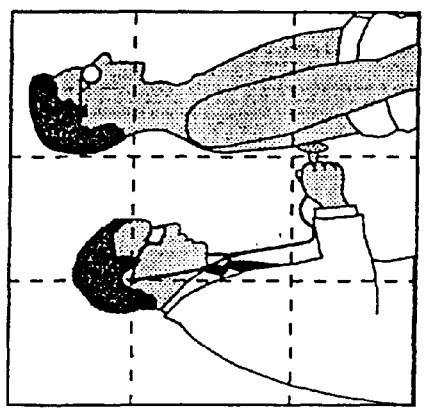
Figure 5:
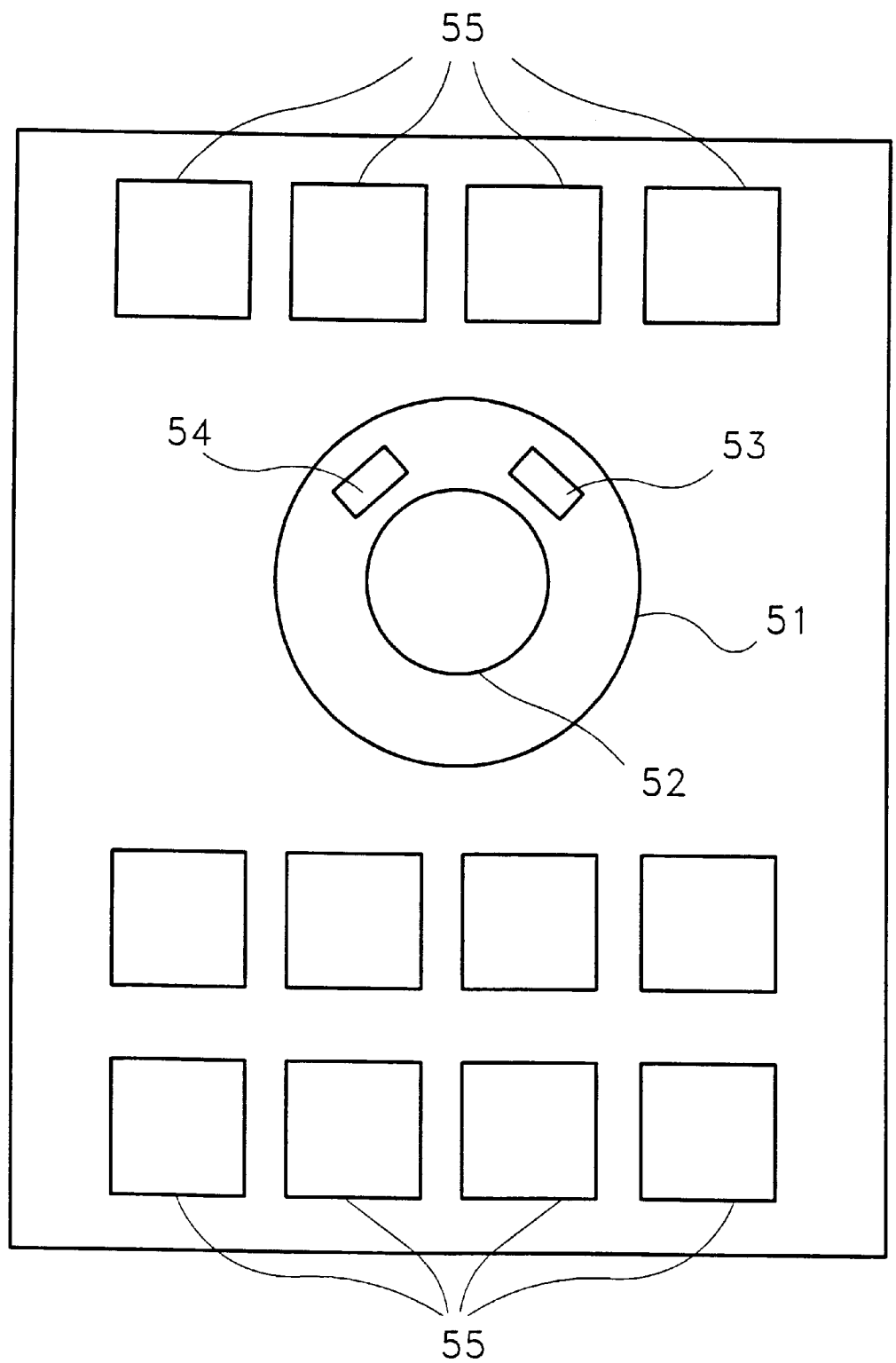
FIG. 5 is a top plan view of a controller according to the present invention.

Referring to FIG. 5 which shows a remote controller 50 according the present invention which comprises a group of mouse functional key portion 51 including a cursor control knob 52 and two side button 53 and 54, one for function selecting and another for clearing/resetting and a plurality of functional keys 55 are used as the functional keys (F1-F12) on the keyboard of a computer which can be preset respectively one simple order for each of the keys including at least a zoom function key, a zoom rate control key, and a group of partial area performance keys each present to convert one preformed partial area of the computer display 35, as shown in FIG. 1A, into a zoomed display on the TV, screen 70 as shown in FIG. 1B, by a ore-key operation of the user, while the cursor control knob 52 and two side button 53, 54 are used for providing an adjustable partial area which the user expected to convert from a computer display 35 zoomed to a TV, screen 70.

An infrared wave or a radio wave is used for signal transmission by the remote controller 50 to the remote signal receiver 20 (FIG. 3).

Figure 6:
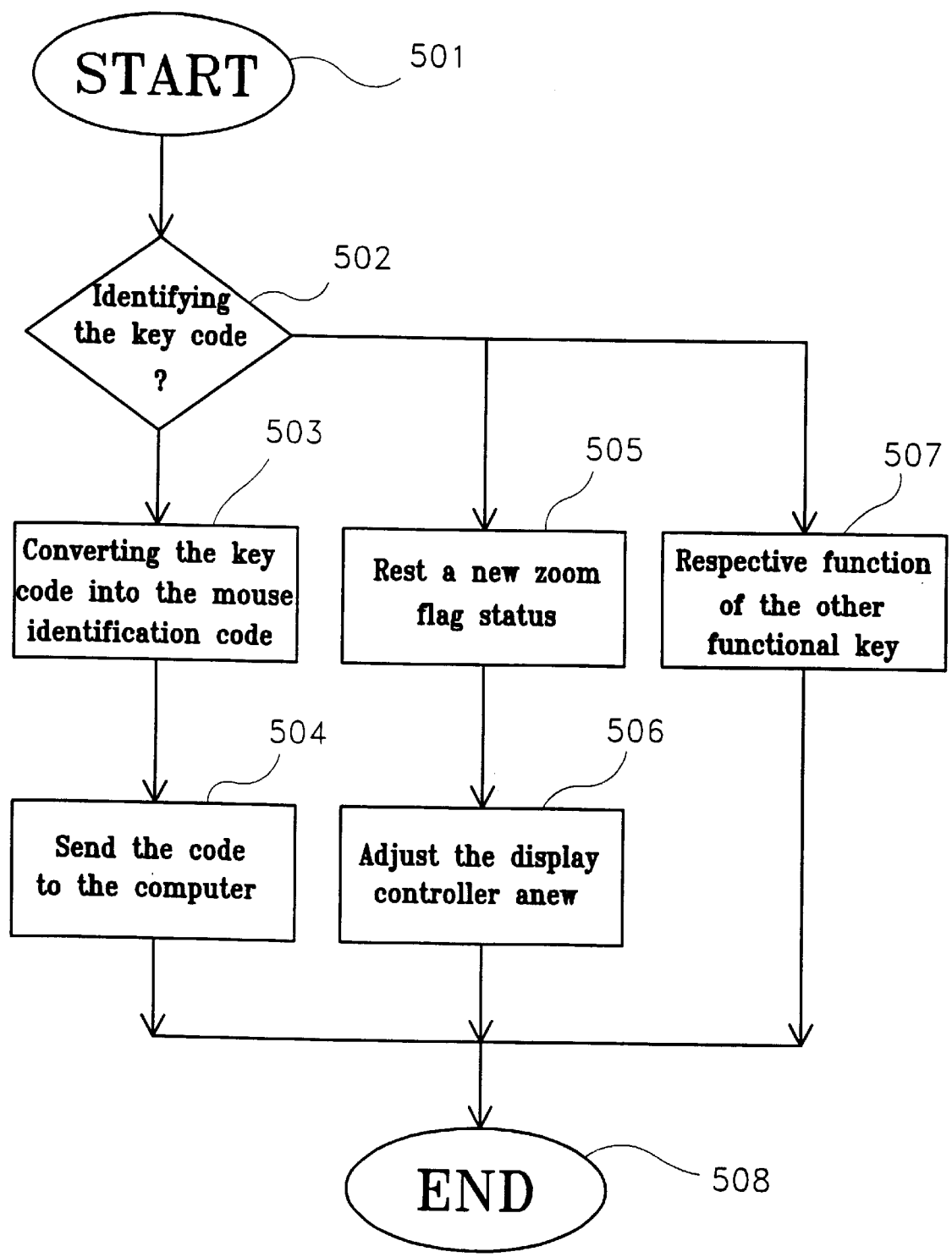
FIG. 6 is a flow chart for a data processing of the remote signal receiver after the remote signal have been received.

Referring to FIG. 6, a flow chart for a data processing of the remote signal receiver 20 and die main converter 10 after the remote sign have been received.

Step 501, is a step for remote signal reading.

Step 502, converting the infrared code serial signal into a key code and identifying the key code to define what a next step should be taken.

If the key code shows a mouse function signal, the next step will automatically followed by step 503. If the key code shows a zoom function signal, the next step will be step 505, otherwise. If the key code shows a particular function signal then the next step will be step 507.

Step 503, converting the key code of the cursor control knob (52) and the two side button (53, 54) into the mouse identification code according to the standard code of the mouse.

Step 504, encoding the mouse identification code received from step 503 into a serial form and then send it to the computer 30 by a speed of 1200 bit/sec. to provide the coordinate of the cursor then displayed to the computer screen.

Step 505, to reset a new zoom flag status, while to reset to set status if the present status shows a clear status, otherwise to reset to clear status if the present status shows a set status.

Stop 506, following step 505 just the display controller anew according to the new zoom Step 507, according to the respective function of the other functional key to take responsive action respectively.

Step 508, recover to step 501 of waiting status.

Figure 7:
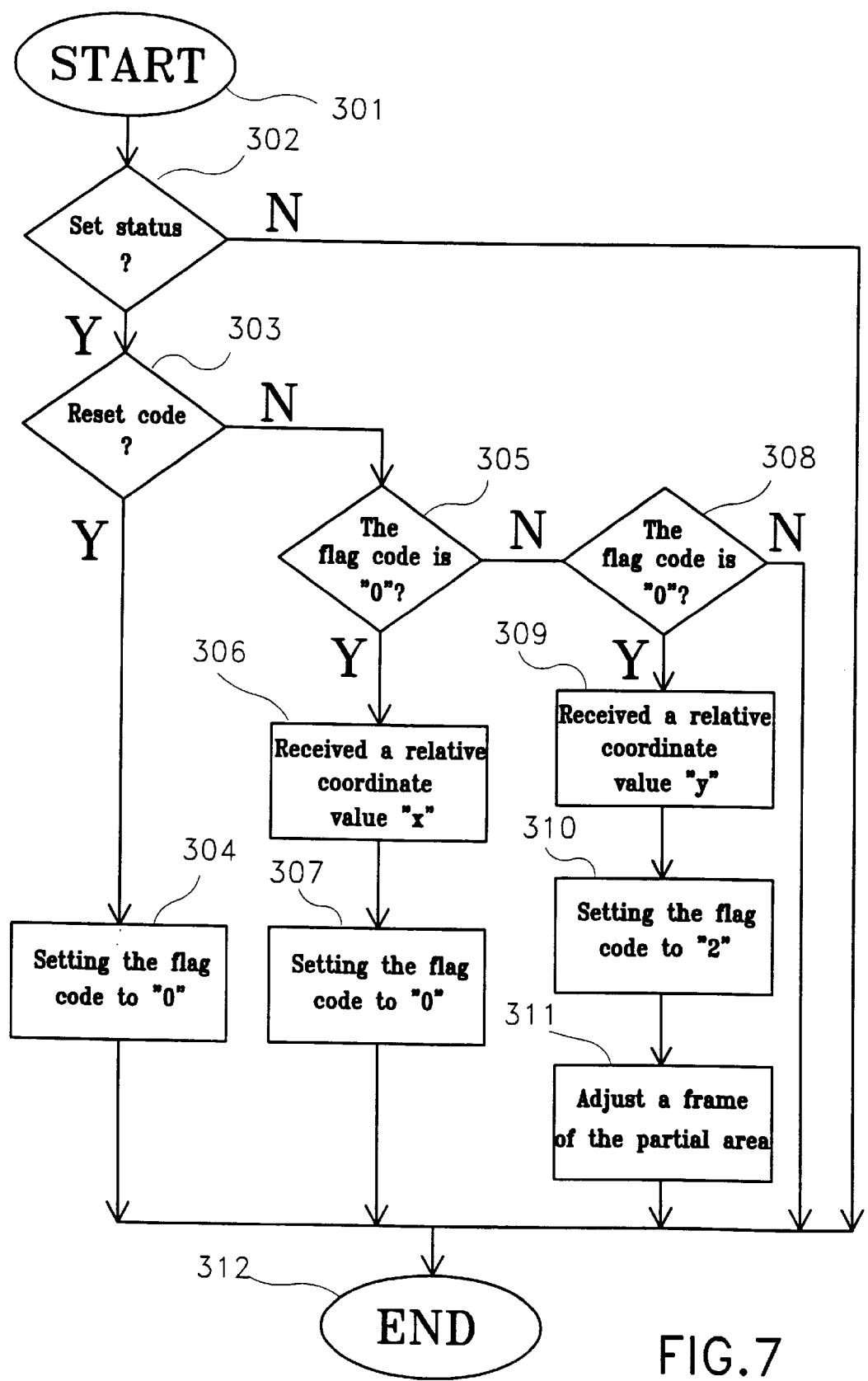
FIG. 7 is a chart of a method provided, according to the present invention for addressing a computer cursor center by a cursor coordinate converting device shown in FIGS. 2A & 2B.

Referring to FIG. 7, a flow chart for receiving a relative coordinate transferred from coordinate converting device 31.

Step 301, for reading the cursor's relative coordinate code.

Step 302, is a step to detect the zoom flag signal and to define what a next step should be then.

If the zoom flag signal shows a "clear" status, there is no further step should be taken to the relative coordinate code. If the zoom flag signal shows a "set" status, then a step 303 should be followed.

Step 303, is a step to identify the relative coordinate code to define what a next step should be taken.

If the relative coordinate code is a predetermined "reset" code then a step 304 should be taken. If the relative coordinate code is not a predetermined "reset" code then a step 305 should be followed.

Step 304, to set the address receiving flag code to "0" and recover the status to original step 301 while the relative coordinate code is a predetermined "reset" code.

Step 305, while the relative coordinate code is not a predetermined "reset" code, the address receiving flag code may be one of the tree values as "0", "1" and "2" If the value is "0", that means an "X" value of relative coordinate win be received, then a step 306 should be followed. If the value is "1" that means a "Y" value of relative coordinate will be received, then a step 309 should be followed. If the value is "2" that means both the "X" and "Y" values are accepted already there is no firer step should be taken and recover to step 301 automatically.

Step 306, while a relative coordinate value received after an address receiving flag code "0" this value will be used as an order of an "X" coordinate to the cursor for operating the mouse functional knob 52.

Step 307, setting the address receiving flag code to "1" status.

Step 309, while a relative coordinate value received after step 307, this value will be used as an order of a "Y" coordinate to the cursor for operating the mouse functional knob 52.

Step 310, setting the address receiving flag code to "2" status, that means both the "X" and "Y" relative coordinate values are received.

Step 311, the cursor automatically track to a right position according to the "X" and "Y" relative coordinate been received, and then to adjust a frame of the partial area expected to zoom by making the relative coordinates of the cursor as a graphic center of the frame.

Step 312, recover to step 301.

Figure 8:
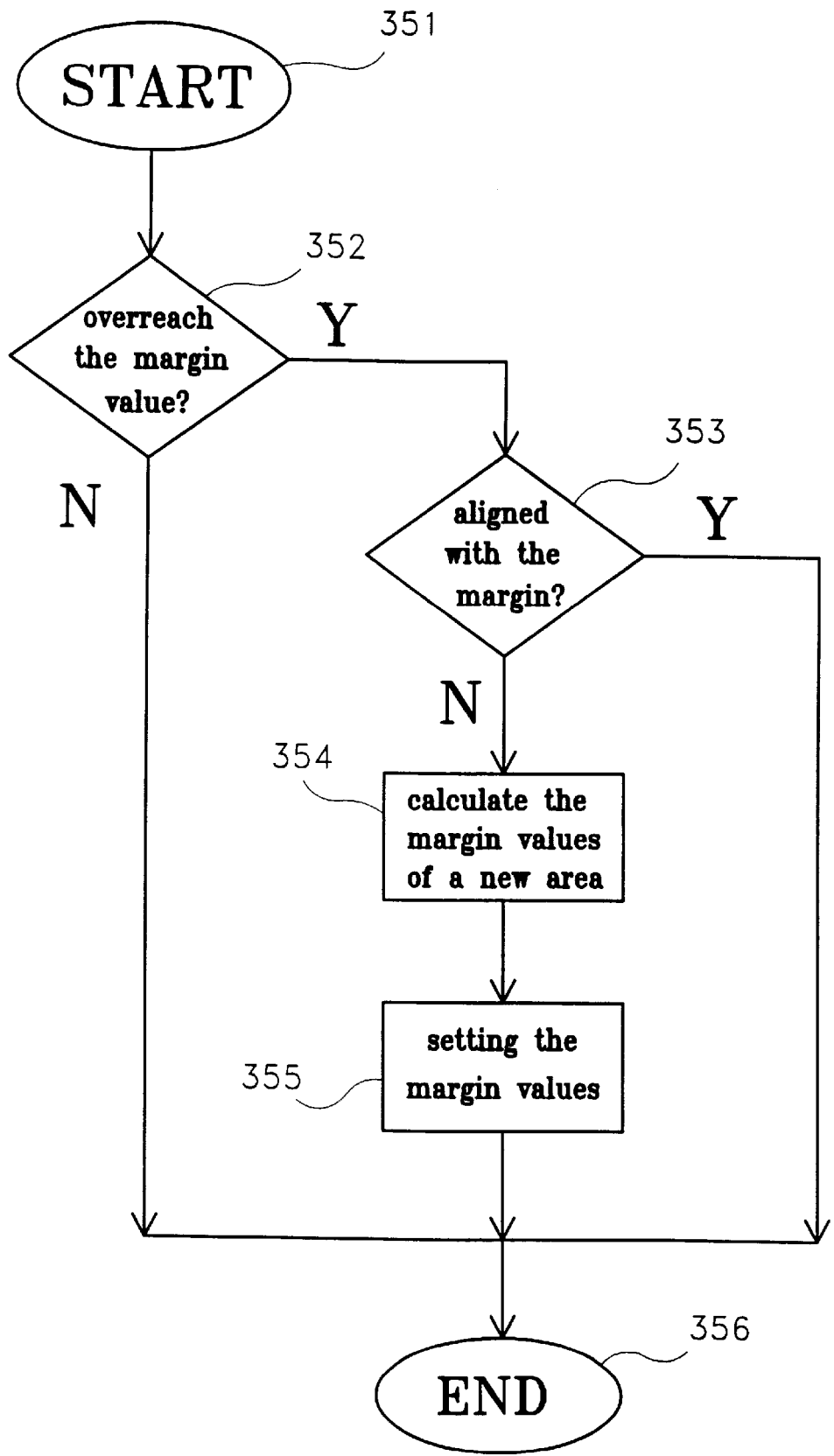
FIG. 8 is a flow chart of automatically tracking the address of the cursor center and deter g the expected zoom area if a correction should be made.

Referring to FIG. 8, A flow chart of automatically tracking the address of the cursor center and determining the expected zoom area if a correction should be made, which shows a detail procession of step 311 and followed from step 310 of FIG. 7 in fact.

Step 351, is just the same of step 310 of FIG. 7, in which both the "X" and "Y" relative coordinate values are received.

Step 352, to determine if the relative coordinate values of the cursor have over-reached the margin value of the current zoom area or not, while the relative coordinate values have not over-reached the margin value of the current zoom area, that means the cursor is still in the visible region of the TV, screen there will no further action showed be taken and directly followed on step 356 for recovering to step 312, and if there have over-reached then a next step 353 showed be followed up.

Step 353, to determine if the margin of the area expected to zoom have aligned with the margin of a computer display or not, there will be no step followed on if they have aligned and a step 354 will be followed while they have not aligned.

Step 354, by assuming the available relative coordinate values of the cursor as a graphic center to calculate the margin values of a new area expected to zoom with the margin be aligned not over-reaching the edge of the computer display.

Step 355, setting the margin values calculated from 354 into the hardware display controller 27 (see FIG. 4) to provide a new zoomed image in the TV, screen including a new cursor there in.

Step 356, recover to step 301 for waiting the new orders.

Figure 9:
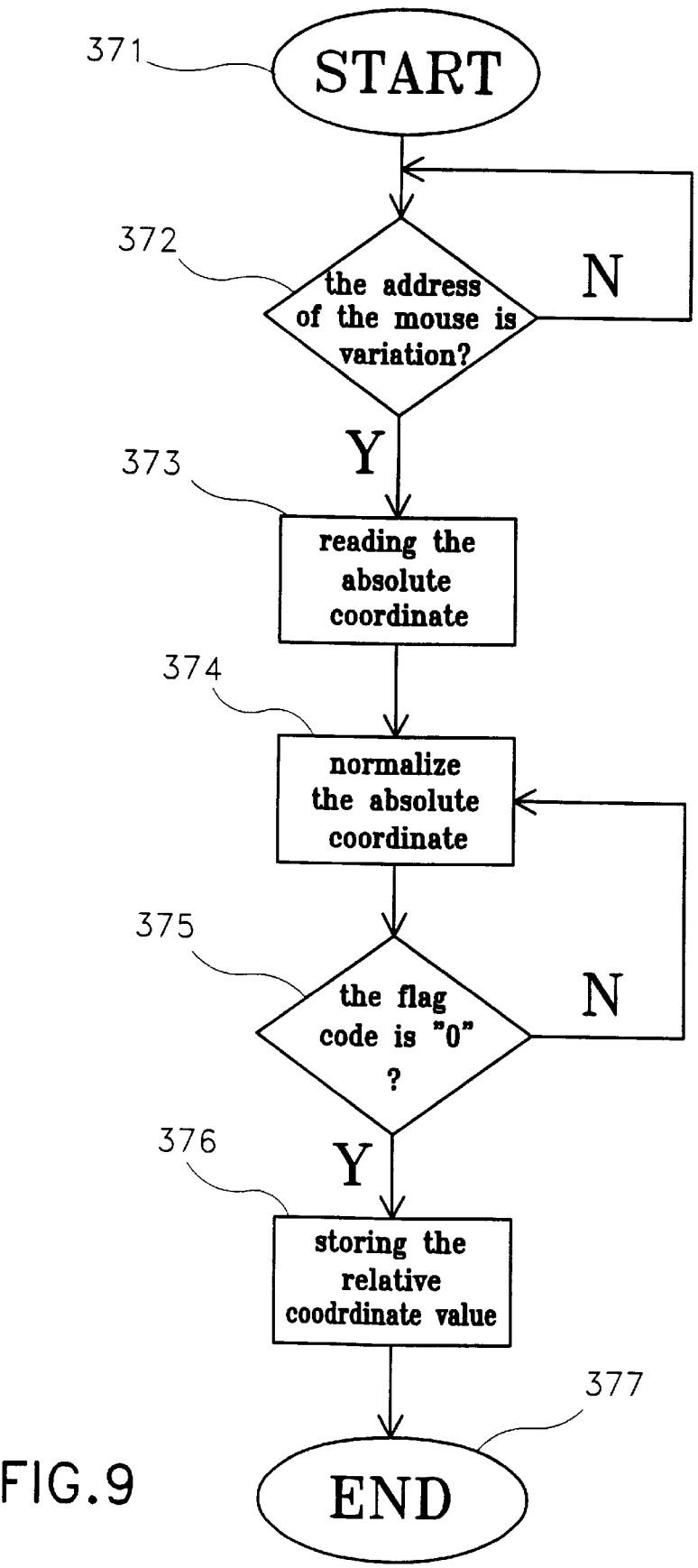
FIG. 9 is a flow chart for setting the relative coordinates of the cursor.

Referring to FIG. 9, a flow chart for setting the relative coordinates of the cursor by the coordinate converting device 31 (see FIG. 3) according to the present invention, while:

Step 371, start to call the mouse driven process and reading the signal of the input order.

Step 372, determining the address of the mouse if there is any variation, while there is no variation then return to step 371, if there is some variation then follow on step 373.

Step 373, calling for mouse driven process, and reading the absolute coordinate of the cursor center according to the specified numbers of the scan lines of the computer display. (In a general specification the scan lines will be 640×480, then the latitudinal coordinate value "X" will between 0~639, and the longitudinal coordinate value "Y" will between 0~479).

Step 374, to normalize the absolute coordinate values read from step 373 to a relative coordinate which both the "X" and "Y" values are between 0~126.

Step 375, detecting the output flag code, and to renew the coordinate value for output if the flag code is "0", otherwise keep waiting for a "0" flag code occurred.

Figure 10:
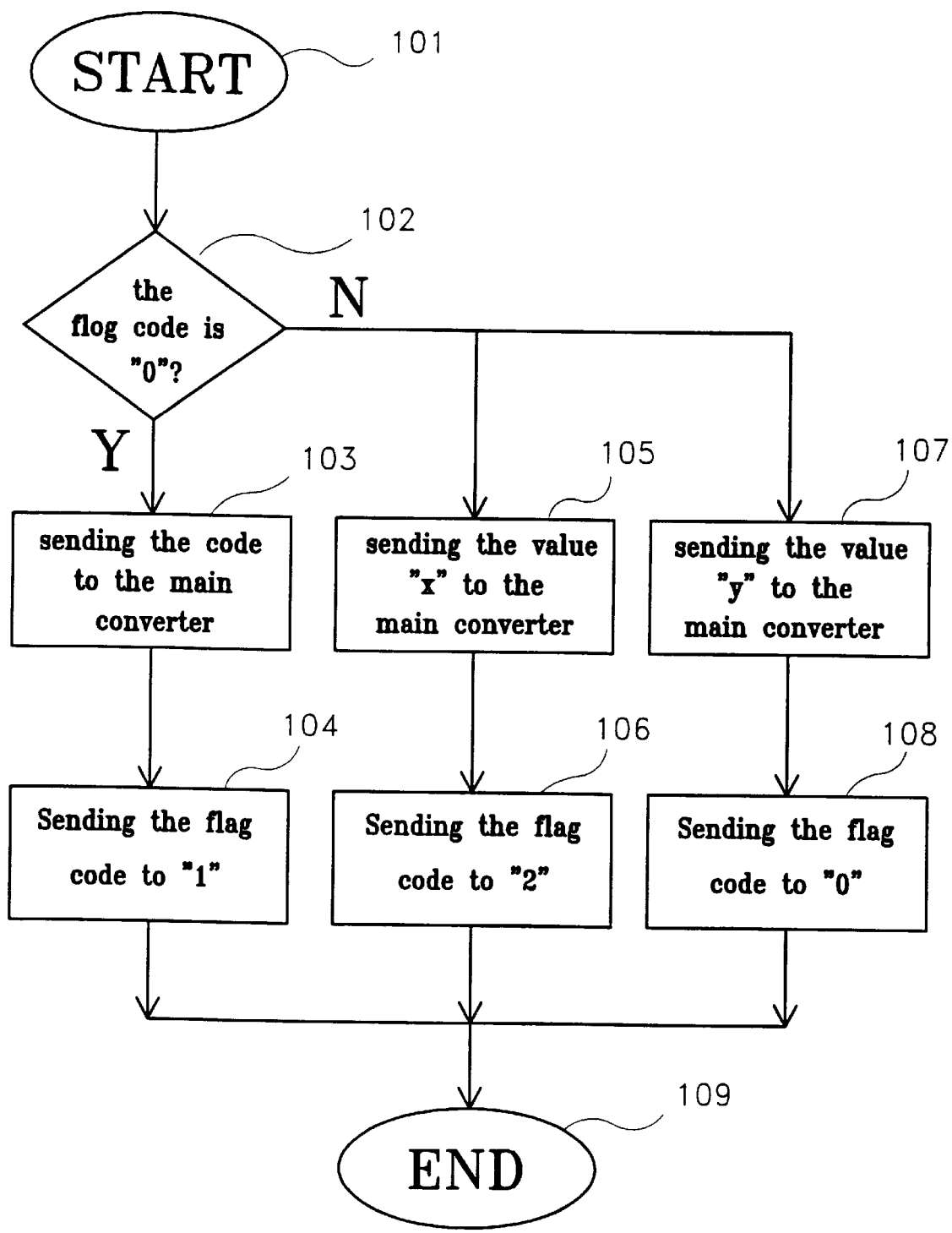
FIG. 10 is a flow chart for setting the relative coordinates of a partial area expected to zoom.

Step 376, storing the relative coordinate value to a status ready for output, then it will be sent to the main converter by a form of fixed timing through the steps showing in FIG. 10.

Step 377, recover to step 371.

Referring to FIG. 10, a flow chart for transferring the relative coordinates of a partial area expected to zoom by the coordinate converting device of the present invention.

Step 101 start to receive the order which triggered by the computer fixed timing.

Step 102, detecting the output flag code of the order followed to step 101, a step 103 will be followed if the code is "0", and a step 105 will be followed if the code is "1", while a step 107 will be followed if the code is "2".

Step 103, sending a reset code (127) to the main converter through the serial port (RS-232) of the computer.

Step 104, setting the output flag code to "1", ready for sending a latitudinal relative coordinate value as step 105.

Step 105, sending a latitudinal relative coordinate value "X" (a value between 0~126) to the main converter.

Step 106, setting the output flag code to "2" ready for sending a longitudinal relative coordinate value as step 107.

Step 107, sending a longitudinal relative coordinate value "Y" (a value between 0~126) to the main converter.

Step 108, setting the output flag code to "0" ready for sending a reset code of a new order.

Step 109, recover to step 101.

What is claimed is:

1. A computer-TV, video converting apparatus which converting any determined partial area of a computer display to a zoomed image displayed on a TV, screen by operating a computer mouse or a mouse functional remote controller to move the computer cursor to a center of the partial area which expect to convert, in addition to a preformed partial area converting function which comprises:

a computer cursor coordinate converting device attached to the computer for converting an absolute coordinate of the cursor center into a relative coordinate and setting a frame of the partial area of said computer display expected to zoom;

a main converter for converting partial area of computer display signal into a zoomed display video signal to the TV, screen mainly comprising an analog/digital (A/D)) converter, a clock/timing generator, a flick filter for temporarily storage the data provided from said A/D converter and said clock/timing generator, a microprocessor for receiving the relative coordinate data came from said computer cursor coordinate converting device and delivering the processed data to a display controller according to the timing data produced by said clock/timing generator, a display clock/timing generator and said clock/timing generator for controlling a zoom rate signal and area size signal and delivering those to a video encoder through a TV, synchronous signal generator and a digital/analog (D/A) converter for providing the acceptable video signal to the TV, screen, and a remote signal receiver for receiving the remote signal for said microprocessor; and a remote controller providing infrared or radio signal to said remote signal receiver of said main converter comprising a mouse functional knob for moving the cursor, two mouse functional button, including a selector and a clear button and a plurality of functional keys including at let a zoom function key, a zoom rate control key and a group of partial area performance keys each preset to convert a preformed partial area of said computer display respectively into said zoomed image displayed onto the TV, screen.

2. The computer-TV, video converting apparatus according to claim 1, wherein said computer cursor coordinate device for converting the coordinate of the cursor center at least comprising the steps of:

reading the absolute coordinate of the cursor center according to the specified numbers of said scan lines of the computer display;

normalizing the absolute coordinate values of the cursor center to the relative coordinate; and sending the relative coordinate values to the microprocessor of said converter by a form of fixed timing.

3. A computer-TV, video converter according to claim 1, said microprocessor of said main converter comprises a random access memory (RAM) for storing the relative coordinate code of the computer cursor and tracking the address of cursor center automatically to determine the display area which expect to convert.

4. A computer-TV, video converter according to claim 1 or 3, wherein said microprocessor of said main converter for automatically tracking the address of the cursor center and determining the display to the TV, screen.

5. A computer-TV, video converter according to claim 1, said clock/timing generator and said display clock/timing generator have an output frequency adjusting device to take responsive action according to the command of said microprocessor for effecting said display controller to obtain a zoom rate reset function of the TV, display.

* * * * *